United States Patent
Kracke (10) Patent No.: US 10,883,554 B2
(45) Date of Patent: Jan. 5, 2021

(54) BRAKING OR CLUTCH ASSEMBLY FOR ROTATING SHAFTS

(71) Applicant: Goodrich Actuation Systems Limited, Solihull (GB)

(72) Inventor: Jeremy Kracke, Staffordshire (GB)

(73) Assignee: GOODRICH ACTUATION SYSTEMS LIMITED, Wolverhampton (GB)

( * ) Notice: Subject to any disclaimer, the term of this patent is extended or adjusted under 35 U.S.C. 154(b) by 115 days.

(21) Appl. No.: 16/059,294

(22) Filed: Aug. 9, 2018

(65) Prior Publication Data
US 2019/0063511 A1 Feb. 28, 2019

(30) Foreign Application Priority Data
Aug. 25, 2017 (EP) ..................................... 17187964

(51) Int. Cl.
| | | |
|---|---|---|
| F16D 41/069 | (2006.01) | |
| F16D 41/10 | (2006.01) | |
| F16D 27/10 | (2006.01) | |
| F16D 51/62 | (2006.01) | |
| F16D 41/08 | (2006.01) | |

(Continued)

(52) U.S. Cl.
CPC ............ *F16D 41/069* (2013.01); *F16D 27/04* (2013.01); *F16D 27/10* (2013.01); *F16D 41/088* (2013.01); *F16D 41/105* (2013.01); *F16D 51/00* (2013.01); *F16D 51/62* (2013.01); *F16D 65/028* (2013.01); *F16D 2041/0603* (2013.01); *F16D 2125/66* (2013.01)

(58) Field of Classification Search
CPC ...... F16D 41/069; F16D 41/07; F16D 41/084; F16D 41/088; F16D 41/105; F16D 27/04
See application file for complete search history.

(56) References Cited

U.S. PATENT DOCUMENTS

| | | | |
|---|---|---|---|
| 4,266,635 A | 5/1981 | Kondo | |
| 4,901,831 A * | 2/1990 | Ito ......................... | B62D 5/043 180/444 |

(Continued)

FOREIGN PATENT DOCUMENTS

| | | |
|---|---|---|
| EP | 1712810 A2 | 10/2006 |
| GB | 1246180 A | 9/1971 |
| WO | 2011142253 A1 | 11/2011 |

OTHER PUBLICATIONS

Extended European Search Report for International Application No. 17187964.6 dated Mar. 12, 2018, 7 pages.

*Primary Examiner* — Stacey A Fluhart
(74) *Attorney, Agent, or Firm* — Cantor Colburn LLP (57) ABSTRACT

A braking assembly is disclosed comprising a shaft, a brake cage being rotatable with the shaft, an earth ring extending circumferentially around the brake cage, at least one engagement member coupled to the shaft, and a braking mechanism configured for selectively applying a force to the brake cage for slowing or preventing rotational movement of the brake cage such that the shaft rotates relative to the brake cage, and wherein the braking assembly is configured such that when the shaft rotates relative to the brake cage, said at least one engagement member is urged to engage the earth ring such that rotation of the shaft is inhibited or prevented. The earth ring may be replaced with an output shaft such that the assembly operates as a clutch assembly.

14 Claims, 3 Drawing Sheets

(51) Int. Cl.
*F16D 27/04* (2006.01)
*F16D 51/00* (2006.01)
 F16D 65/02 (2006.01)
 F16D 41/06 (2006.01)
 F16D 125/66 (2012.01)

(56) References Cited

U.S. PATENT DOCUMENTS

| | | | |
|---|---|---|---|
| 2002/0125097 | A1* | 9/2002 | Ochab ................ B60K 17/3515 |
| | | | 192/38 |
| 2003/0132081 | A1 | 7/2003 | Severinsson |
| 2005/0236246 | A1* | 10/2005 | Joki ....................... B60K 17/02 |
| | | | 192/35 |
| 2006/0185956 | A1 | 8/2006 | Yasui et al. |
| 2006/0196747 | A1* | 9/2006 | Wittkopp .............. F16D 41/088 |
| | | | 192/35 |
| 2017/0051797 | A1* | 2/2017 | Yamatani ................ F16D 27/10 |

\* cited by examiner

BRAKING OR CLUTCH ASSEMBLY FOR ROTATING SHAFTS

FOREIGN PRIORITY

This application claims priority to European Patent Application No. 17187964.6 filed Aug. 25, 2017, the entire contents of which is incorporated herein by reference.

FIELD

The present disclosure relates to brakes for a rotating shaft. The present disclosure also relates to clutch assemblies for engaging and disengaging rotating shafts.

BACKGROUND

Various types of braking assemblies are known for halting the rotation of a shaft. Such assemblies are often designed to use a relatively low actuation force but maximise the torque capacity of the brake. Similarly, clutch assemblies are known for engaging and disengaging input and output shafts using relatively low actuation forces.

SUMMARY

The present disclosure provides a selective shaft engaging assembly comprising: a first shaft; a brake cage being rotatable with the first shaft; a surrounding member extending circumferentially around the brake cage; at least one engagement member coupled to the first shaft; and a braking mechanism configured for selectively applying a force to the brake cage for slowing or preventing rotational movement of the brake cage such that the first shaft rotates relative to the brake cage; wherein the assembly is configured such that when the first shaft rotates relative to the brake cage, said at least one engagement member is urged towards the surrounding member.

The selective shaft engaging assembly may be a braking assembly; wherein the surrounding member may be an earth ring. When the first shaft rotates relative to the brake cage, the at least one engagement member may be urged towards the surrounding member such that rotation of the first shaft is inhibited or prevented. By way of example, the first shaft in the braking assembly may be an input shaft or output shaft of a system that is driven by the input shaft.

Alternatively, the selective shaft engaging assembly may be a clutch assembly; wherein the first shaft is an input shaft; wherein the surrounding member is an output shaft, and wherein when the input shaft rotates relative to the brake cage, the at least one engagement member is urged towards the output shaft so as to couple the input and output shafts such that rotation of the input shaft drives rotation of the output shaft.

The present disclosure provides a braking assembly comprising: a shaft; a brake cage being rotatable with the shaft; an earth ring extending circumferentially around the brake cage; at least one engagement member coupled to the shaft; and a braking mechanism configured for selectively applying a force to the brake cage for slowing or preventing rotational movement of the brake cage such that the shaft rotates relative to the brake cage; wherein the braking assembly is configured such that when the shaft rotates relative to the brake cage, said at least one engagement member is urged towards the earth ring such that rotation of the shaft is inhibited or prevented.

The brake cage may be configured to prevent circumferential movement of the engagement member relative thereto. The engagement member may be arranged on a surface of the shaft, and the surface of the shaft may be configured such that when the shaft rotates relative to the brake cage the engagement member is urged towards the earth ring.

The earth ring may be fixedly attached to a static housing of or around the braking assembly to provide a fixed 'hard' earth. The earth ring may be fixed attached by any suitable means, such as by dowelling. Alternatively, the earth ring may be moveably connected or coupled to the housing such that it can move in a frictionally restricted manner relative thereto, to provide a 'softer' or limited braking effect. The earth ring may be connected or coupled by any suitable means, such as via friction plates.

The at least one engagement member may extend through a respective aperture in the brake cage, such that the brake cage prevents circumferential movement of the engagement member relative thereto. The aperture may be substantially the same size as the engagement member extending therethrough. The engagement member may be urged towards the earth ring through this aperture.

The engagement member may be a cylindrical roller, although other geometries are contemplated. For example, the engagement member may be an asymmetric figure-eight shaped roller, or a sprag, such as a non-revolving asymmetric figure-eight shaped sprag. When the engagement member is a sprag, the brake cage may be a sprag cage.

The surface of the shaft on which the engagement member is located may be a ramped surface, e.g. a curved well in the shaft or other shaped ramp. If a plurality of engagement members are provided then a respective plurality of such surfaces may be provided.

The cross-section of the shaft may be generally circular. When the plurality of engagement members are sprags, the outer surface of the shaft may define an inner race of a "sprag clutch", and an inner surface of the earth ring may define an outer race of the "sprag clutch".

The braking assembly may comprise at least one biasing member coupling the shaft to the brake cage such that rotation of the shaft drives rotation of the brake cage.

The at least one biasing member may be any suitable member, such as a resiliently flexible member. For example, the biasing member may be one or more springs such as a leaf springs, coil spring, or torsion spring.

The at least one biasing member may be configured to bias the circumferential position of the brake cage relative to the shaft such that the engagement member is located on the surface of the shaft at a first, radially inward position, e.g. such that rotation of the shaft is not prevented.

The braking assembly may be configured such that said rotation of the shaft relative to the brake cage overcomes a biasing force of the at least one biasing member such that the engagement member is located on the surface of the shaft at a second, radially outward position, e.g. such that rotation of the shaft is inhibited or prevented.

In embodiments, the braking mechanism need only be capable of providing a force to the brake cage large enough to overcome the biasing force provided by the at least one biasing member in order to slow or prevent the rotation of the brake cage relative to the shaft, and thereby urge the one or more engagement member towards the radially outward position.

The brake cage may comprise, or is coupled to, a brake plate or other brake surface, and the braking assembly may comprise a moveable member that is selectively movable into or out of contact with the brake plate or brake surface for providing a braking force on the brake plate or brake surface and hence to the brake cage.

The moveable member may be a brake pad or ring.

The braking mechanism may comprise a brake spring configured to bias the moveable member either towards, or away from, the brake plate or brake surface.

The braking mechanism may comprise an electromagnet arranged and configured such that when energised the electromagnet urges the moveable member away from, or towards, the brake plate or brake surface. However, other means of moving the movable member are contemplated.

The electromagnet may urge the moveable member away or towards the brake plate or brake surface by directly acting on the moveable member, or by acting on another component which then moves the moveable member.

The electromagnet may be a solenoid.

The braking mechanism may be activated by any suitable activation means. For example, the assembly may be part of a system that is driven by the shaft and that comprises a torque sensor coupled to the braking mechanism. If the sensor detects excessive torque in the system then the braking mechanism may be automatically activated, e.g. by energising or de-energising the electromagnet such that the shaft rotates relative to the brake cage. When the sensor detects a reduced torque, the braking mechanism may be automatically deactivated so that the shaft and brake cage may realign such that the engagement members can move radially inwards. Alternatively, the braking system may be activated and/or deactivated manually.

The present disclosure also provides a clutch assembly comprising: an input shaft; a brake cage being rotatable with the input shaft; an output shaft extending circumferentially around the brake cage; at least one engagement member coupled to the input shaft; and a braking mechanism configured for selectively applying a force to the brake cage for slowing or preventing rotational movement of the brake cage such that the input shaft rotates relative to the brake cage; wherein the assembly is configured such that when the input shaft rotates relative to the brake cage, said at least one engagement member is urged towards the output shaft so as to couple the input and output shafts such that rotation of the input shaft drives rotation of the output shaft.

The brake cage may be configured to prevent circumferential movement of the engagement member relative thereto. The engagement member may be arranged on a surface of the input shaft, and the surface of the input shaft may be configured such that when the input shaft rotates relative to the brake cage the engagement member is urged towards the output shaft.

The at least one engagement member may extend through a respective aperture in the brake cage, such that the brake cage prevents circumferential movement of the engagement member relative thereto. The aperture may be substantially the same size as the engagement member extending therethrough. The engagement member may be urged towards the output shaft through this aperture.

The engagement member may be a cylindrical roller, although other geometries are contemplated.

The surface of the input shaft on which the engagement member is located may be a ramped surface, e.g. a curved well in the input shaft or other shaped ramp. If a plurality of engagement members are provided then a respective plurality of such surfaces may be provided.

The assembly may comprise at least one biasing member coupling the input shaft to the brake cage such that rotation of the input shaft drives rotation of the brake cage.

The at least one biasing member may be any suitable member, such as a resiliently flexible member. For example, the biasing member may be one or more springs such as a leaf springs, coil spring, or torsion spring.

The at least one biasing member may be configured to bias the circumferential position of the brake cage relative to the input shaft such that the engagement member is located on the surface of the input shaft at a first, radially inward position, e.g. such that the input and output shafts are not coupled to the extent that rotation of the input shaft would drive rotation of the output shaft.

The assembly may be configured such that said rotation of the input shaft relative to the brake cage overcomes a biasing force of the at least one biasing member such that the engagement member is located on the surface of the shaft at a second, radially outward position, e.g. so as to couple the input and output shafts such that rotation of the input shaft drives rotation of the output shaft.

The braking mechanism need only be capable of providing a force to the brake cage large enough to overcome the biasing force provided by the at least one biasing member in order to slow or prevent the rotation of the brake cage relative to the input shaft, and thereby urge the one or more engagement member towards the radially outward position.

The brake cage may comprise, or be coupled to, a brake plate or other brake surface. The braking assembly may comprise a moveable member that is selectively movable into or out of contact with the brake plate or brake surface for providing a braking force on the brake plate or brake surface and hence to the brake cage.

The moveable member may be a brake pad or ring.

The braking mechanism may comprise a brake spring configured to bias the moveable member either towards, or away from, the brake plate or brake surface.

The braking mechanism may comprise an electromagnet arranged and configured such that when energised the electromagnet urges the moveable member away from, or towards, the brake plate or brake surface. However, other means of moving the movable member are contemplated.

The electromagnet may urge the moveable member away or towards the brake plate or brake surface by directly acting on the moveable member, or by acting on another component which then moves the moveable member.

The electromagnet may be a solenoid.

The braking mechanism may be activated by any suitable activation means. For example, the assembly may be part of a system comprising a torque sensor coupled to the braking mechanism. If the sensor detects excessive torque in the system (e.g. at the output shaft or input shaft) then the braking mechanism may be automatically deactivated, e.g. by energising or de-energising the electromagnet. As such, the input and output shafts would decouple and reduce the torque in the system. When the sensor detects a reduced torque, the braking mechanism may be automatically activated so that the input and output shafts would couple. Alternatively, the braking system may be activated and/or deactivated manually.

Embodiments of the present disclosure therefore provide a high capacity, low activation/deactivation power, self-amplifying brake. Alternative embodiments of the present disclosure provide a low activation/deactivation power, self-amplifying clutch. For example, in embodiments where the brake or clutch is activated or deactivated by an electromagnet, then a relatively low voltage and/or current may be used to activate or deactivate the brake or clutch.

Embodiments of the present disclosure may be used in lubricated and/or hydraulic environments, for example, so as to eliminate complex rotary sealing issues.

Embodiments of the present disclosure include aircraft flight controls or other aircraft secondary actuation devices that comprise the brake and/or clutch assemblies disclosed herein. For example, the aircraft flight control may be a secondary flight control, such as a friction brake.

BRIEF DESCRIPTION OF DRAWINGS

Various embodiments will now be described, by way of example only, and with reference to the accompanying drawings in which.

DETAILED DESCRIPTION

Figure 1:
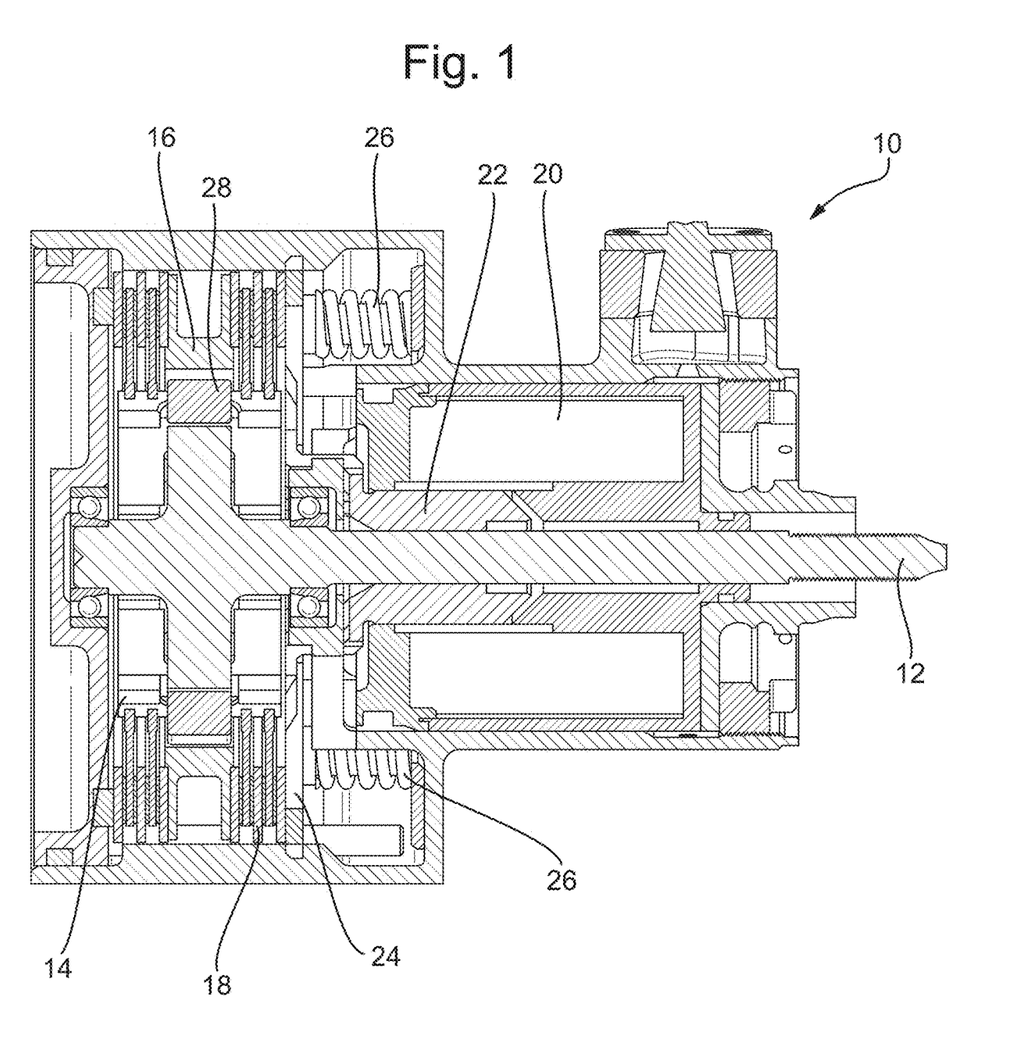
FIG. 1 shows a side sectional view through a braking assembly according to an embodiment of the present disclosure.

FIG. 1 shows a side sectional view through a braking assembly (i.e. a selective shaft engaging assembly) according to an embodiment of the present disclosure. The braking assembly is configured to inhibit or prevent rotational movement of a shaft about its longitudinal axis. The braking assembly 10 comprises a shaft 12 that is rotatable about its longitudinal axis, a brake cage 14 circumferentially surrounding the shaft 12 and that is rotatable about the shaft 12, and a static earth ring 16 (i.e. a surrounding member) extending circumferentially around the brake cage 14. Engagement members 28 may be located between the shaft 12 and the earth ring 16. In the depicted embodiment, the engagement members 28 are cylindrical rollers, although other configurations are contemplated. The engagement members 28 may extend through apertures (not shown) in the brake cage 14. The braking assembly may further include one or more brake plates 18 connected to the brake cage 14 such that the brake plates 18 are rotatable about the shaft along with the brake cage 14, and a moveable member that is moveable into and out of engagement (e.g. into and out of frictional contact) with the brake plates 18. The moveable member may be a brake pad or ring 24 and may be biased into (or out of) frictional contact with the brake plates 18 by one or more brake spring 26. The braking assembly may also comprise an electromagnet/solenoid 20 and a solenoid puller 22 for moving the brake pad or ring 24 away from (or towards) the brake plates 18.

Figure 2:
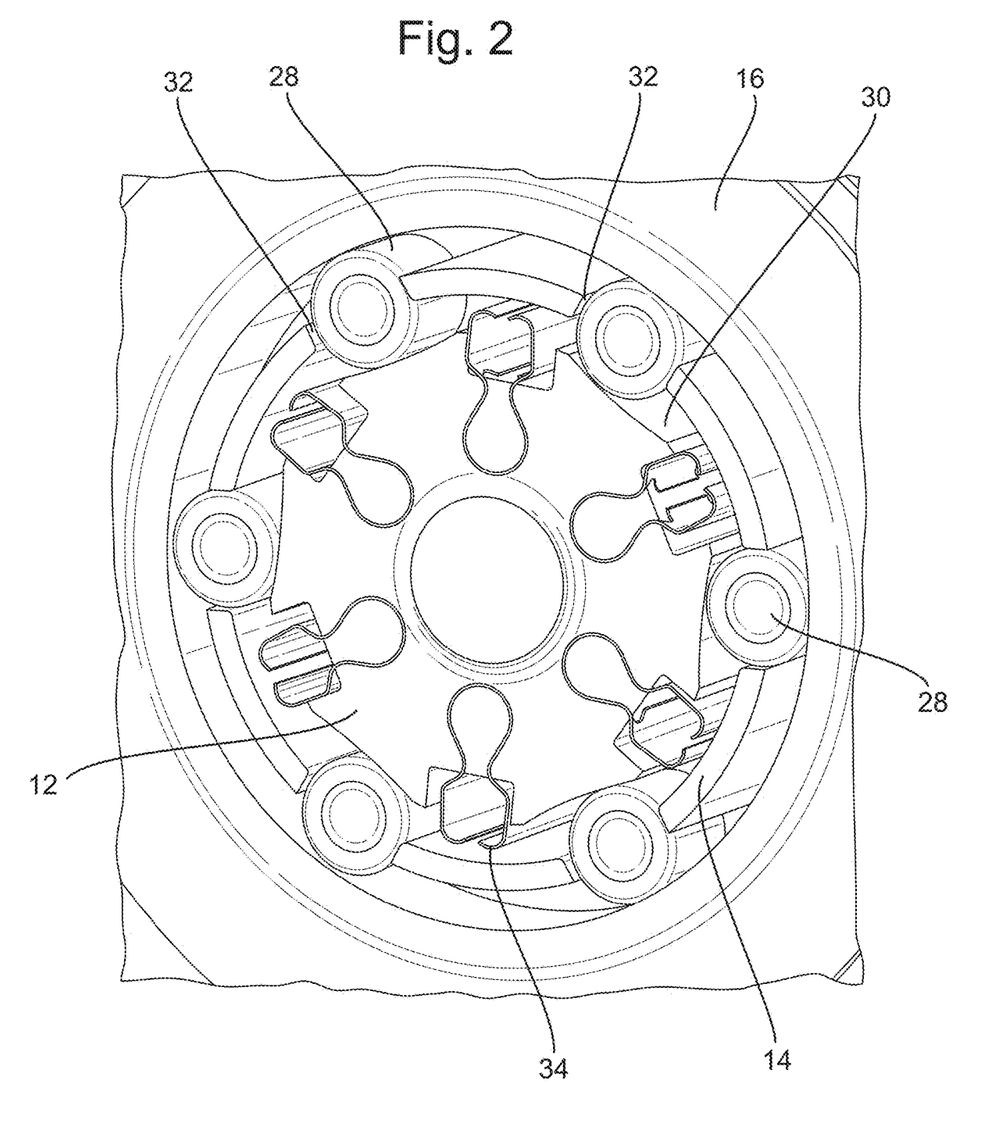
FIG. 2 shows a perspective view of a portion of the braking assembly of FIG. 1.

FIG. 2 shows a perspective view of a portion of the braking assembly of FIG. 1. The shaft 12 may include a plurality of ramps 30, such as curved ramps, on its circumferential surface. Each engagement member 28 may be located on a respective ramp 30 of the shaft 12. Each engagement member 28 may also be located partially within and extend through an aperture 32 of the brake cage 14. The sides (in the circumferential direction) of each aperture 32 in the brake cage 14 are configured to limit the movement of its respective engagement member 28 in the circumferential direction along the ramp 30 on which the engagement member 28 is located.

The braking assembly may further comprise biasing members 34 for biasing the brake cage 14 to rotate with the shaft 12. Each of the biasing members 34 (e.g. leaf springs 34) may be mounted on the shaft 12, e.g. in a pocket on the exterior of the shaft, and comprises at least one portion that extends into contact with the brake cage 14 such that rotation of the shaft 12 and the biasing members 34 thereon causes the brake cage 14 to rotate with the shaft 12. The at least one portion of the biasing member 34 that extends into contact with the brake cage 14 may be resiliently flexible so as to allow the brake cage 14 to rotate relative to the shaft 12, but to resist such relative motion and therefore bias the brake cage 14 to rotate in correspondence with the shaft 12. In the depicted embodiment, each biasing member 34 comprises two portions that extend into contact with the brake cage 14, wherein one of these portions resists movement of the brake cage 14 relative to the shaft 12 in a first circumferential direction and the other of these portions resists movement of the brake cage 14 relative to the shaft 12 in a second, opposite circumferential direction. However, it is contemplated that a single portion could be used to achieve the functions of the two portions described above.

Figure 3A:
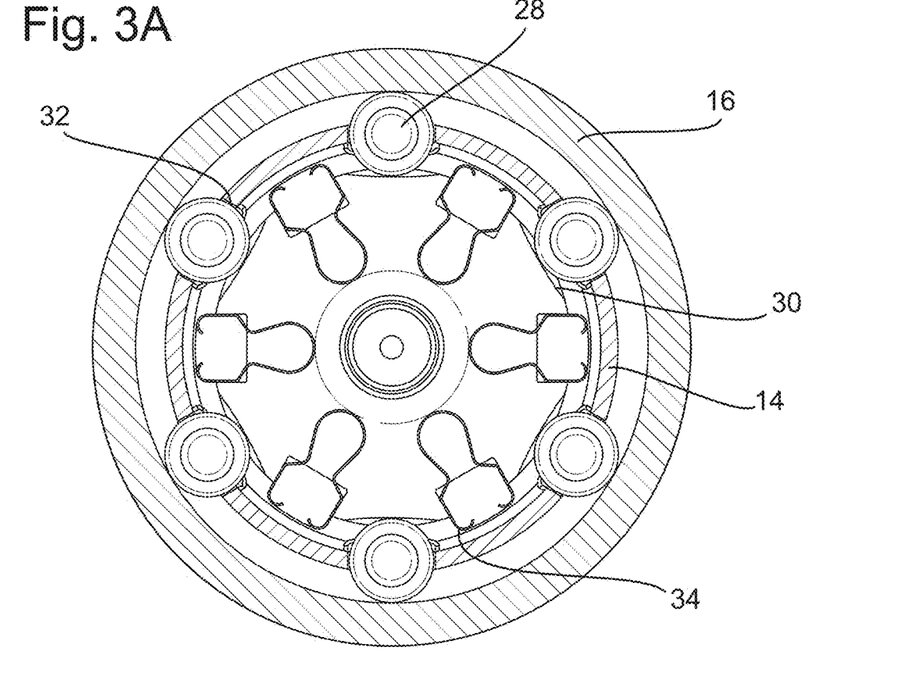
FIG. 3A shows a side view of the portion of the braking assembly of FIG. 2 when the brake cage is rotating with the shaft.
Figure 3B:
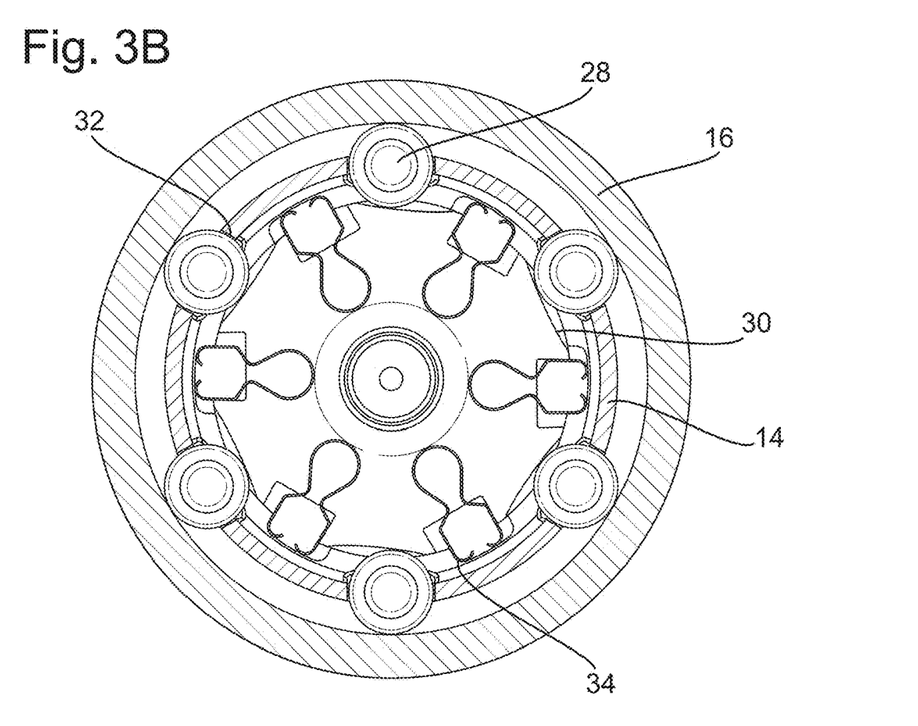
FIG. 3B shows the portion of the braking when a braking force is being applied to the brake cage.

FIGS. 3A and 3B show side views of the portion of the braking assembly of FIG. 2. FIG. 3A shows the braking assembly when the brake cage 14 is rotating with the shaft 12, whereas FIG. 3B shows the braking assembly when a force is being applied to the brake cage.

The operation of the braking assembly will now be described, with reference to the Figures described above. In a first set of embodiments, the one or more brake spring 26 biases the brake pad or ring 24 towards the brake cage 14. The solenoid 20 and the solenoid puller 22 may be arranged and configured such that when the solenoid 20 is activated, i.e. energised, the magnetic field generated by the solenoid 20 moves the solenoid puller 22. The solenoid puller 22 is moved such that it urges the brake pad or ring 24 away from the brake plate 18, compressing the one or more brake spring 26. The solenoid puller 22 therefore overcomes the biasing force of the one or more brake spring 26 so as to move the brake pad or ring 24 away from the brake plates 18, and out of engagement or to a lesser degree of engagement therewith (i.e. out of contact, or such that frictional contact is reduced). Thus, when the solenoid 20 is activated, rotation of the brake plate 18 and hence rotation of the brake cage 14 about the shaft 12 is not significantly inhibited by the brake pad or ring 24.

FIG. 3A shows a portion of the assembly in this non-braking mode. When the shaft 12 is rotated about its rotational axis, the biasing members 34 on the shaft 12 and that are in engagement with the brake cage 14 cause the brake cage 14 to rotate with the shaft 12. The biasing members 34 are arranged and configured such that (in this non-braking mode) when the shaft 12 and brake cage 14 are rotated, the apertures 32 of the brake cage 14 are circumferentially aligned with the ramps 30 on the shaft 12 such that the engagement members 28 are located at the bottom of their respective ramps 30 and at radially inward positions. In this configuration, the engagement members 28 may or may not be in contact the earth ring 16, but in any event the engagement members 28 are not urged against the earth ring 16 in a manner that they significantly inhibit or prevent the rotation of the shaft 12. The engagement members 28 may roll along on the earth ring 16 as the shaft 12 and cage 14 rotate, so as to reduce resistance to rotation generated by their contact.

When it is desired to inhibit or prevent rotation of the shaft 12, the solenoid 20 is deactivated. The solenoid puller 22 therefore no longer urges the brake pad or ring 24 away from the brake plate 18. The biasing force provided by the one or more brake spring 26 thus biases the brake pad or ring 24 against the brake plate 18 so as to provide a frictional force therebetween, which inhibits or prevents the rotation of the brake plate 18 and the brake cage 14 connected thereto (relative to the brake pad or ring 24). However, the brake pad or ring 24 may not act on the shaft 12 and so the shaft 12 rotates relative to the brake cage 14, overcoming the biasing force of the biasing members 34.

FIG. 3B shows the braking mode in which the shaft 12 rotates relative to the brake cage 14. The biasing members 34 permit such movement since the portions of each biasing member 34 that extend from the shaft 12 into contact with the brake cage 14 are resiliently flexible. FIG. 3B shows a mode in which the shaft 12 rotates clockwise relative to the brake cage 14 and hence a first of said portions of each biasing member flex in an anti-clockwise direction. However, it is also contemplated that the shaft 12 may rotate anti-clockwise relative to the brake cage 14 and a second of said portions of each biasing member may flex in a clockwise direction. It is also contemplated that each biasing member 34 may comprise only a single portion that contacts the brake cage 14.

In the braking mode, rotation of the shaft 12 relative to the brake cage 14 causes the ramps 30 on the shaft 12 to move circumferentially relative to the apertures 32 of the brake cage 14. The engagement members 28 located in the apertures 32 of the brake cage 14 are prevented from moving circumferentially relative to the brake cage 14 by contact with the edges of the apertures 32. As the ramps 32 on the shaft 12 move circumferentially relative to the engagement members 28, the engagement members 28 are moved up the ramps 32, out of the bottom of the wells thereof, resulting in the movement of the engagement members 28 away from the centre of the shaft 12 in a radial direction. This causes the engagement members 28 to be urged radially such that they are engaged with both the ramps 32 on the shaft 12 and the earth ring 16 such that rotation of the shaft 12 relative to the earth ring 16 is inhibited or prevented.

Although the brake device described above provides a braking force when the solenoid is not activated, a second set of embodiments is contemplated in which the braking assembly may provide a braking force to the shaft 12 when the solenoid 20 is activated. In these embodiments, the one or more brake spring 26 may be arranged to bias the brake pad or ring 24 away from the brake plates 18. Accordingly, in a normal, non-braking mode of operation in which the solenoid 20 is deactivated, the brake pad or ring 24 may be biased away from the brake plates 18 and such that the assembly may function as described above with respect to FIG. 3A. That is, rotation of the shaft 12 causes the biasing members 34 to drive a corresponding rotation of the brake cage 14.

However, when it is desired to inhibit or prevent rotation of the shaft 12, the solenoid 20 is activated. The solenoid 20 and the solenoid puller 22 may be arranged and configured such that in a braking mode, when the solenoid 20 is activated (i.e. energised), the magnetic field generated by the solenoid 20 moves the solenoid puller 22 such that it urges the brake pad or ring 24 towards the brake plate 18, against the force of the one or more brake spring 26. The solenoid puller 22 therefore overcomes the biasing force of the one or more brake spring 26 so as to move the brake pad or ring 24 towards the brake plates 18, and into engagement or to a greater degree of engagement therewith (i.e. into contact, or such that frictional contact is increased). Thus, when the solenoid 20 is activated, rotation of the brake plate 18 and hence rotation of the brake cage 14 about the shaft 12 is significantly inhibited by the brake pad or ring 24. This braking force on the brake cage 14 overcomes the rotational biasing force caused by the biasing members 34. As such, the shaft 12 rotates relative to the brake cage 14 in the same manner as described above, e.g. with respect to FIG. 3B. Accordingly, a relatively small force provided by activating the solenoid 20 is able to cause a relatively large braking force on the shaft 12 since it activates the urging of the engagement members 28 against the earth ring 16.

Embodiments are contemplated wherein the one or more brake spring 26 is not provided.

Although embodiments have been described above in relation to a braking assembly, the same principle may be used in a clutch assembly in order to engage and disengage an input shaft and an output shaft for being driven by the input shaft. These clutch assembly embodiments are the same as the braking assembly embodiments described above, except that the shaft 12 is an input shaft and the earth ring 16 (i.e. surrounding member) is replaced by an output shaft for being driven by the input shaft. The mechanism described hereinabove is therefore used in the clutch assemblies to move the engagement members 28 so as to selectively couple and decouple the input and output shafts (rather than cause selective braking of the shaft 12).

The operation of such a clutch assembly will now be described with reference to the Figures, in which the member 12 now represents the input shaft of the clutch assembly and the member 16 now represents the output shaft of the clutch assembly for being driven by the input shaft 12.

In a first set of clutch assembly embodiments, one or more brake spring 26 biases the brake pad or ring 24 towards the brake cage 14. The solenoid 20 and the solenoid puller 22 may be arranged and configured such that when the solenoid 20 is activated, i.e. energised, the magnetic field generated by the solenoid 20 moves the solenoid puller 22. The solenoid puller 22 is moved such that it urges the brake pad or ring 24 away from the brake plate 18, compressing the one or more brake spring 26. The solenoid puller 22 therefore overcomes the biasing force of the one or more brake spring 26 so as to move the brake pad or ring 24 away from the brake plates 18, and out of engagement or to a lesser degree of engagement therewith (i.e. out of contact, or such that frictional contact is reduced). Thus, when the solenoid 20 is activated, rotation of the brake plate 18 and hence rotation of the brake cage 14 about the input shaft 12 is not significantly inhibited by the brake pad or ring 24.

FIG. 3A shows a portion of the assembly in this mode. When the input shaft 12 is rotated about its rotational axis, the biasing members 34 on the input shaft 12 and that are in engagement with the brake cage 14 cause the brake cage 14 to rotate with the input shaft 12. The biasing members 34 are arranged and configured such that, in this mode, when the input shaft 12 and brake cage 14 are rotated, the apertures 32 of the brake cage 14 are circumferentially aligned with the ramps 30 on the input shaft 12 such that the engagement members 28 are located at the bottom of their respective ramps 30 and at radially inward positions. In this configuration, the engagement members 28 may or may not be in some degree of contact with the output shaft 16, but in any event the engagement members 28 are not urged against the output shaft 16 in a manner that they significantly couple the input and output shafts 12,16. For example, the engagement members 28 may roll along on the output shaft 16 as the input shaft 12 and cage 14 rotate. Accordingly, in this mode rotation of the input shaft 12 does not drive rotation of the output shaft 16.

When it is desired to couple the input and output shafts 12,16 so that rotation of the input shaft 12 drives rotation of the output shaft 16, the solenoid 20 is deactivated. The solenoid puller 22 therefore no longer urges the brake pad or ring 24 away from the brake plate 18. The biasing force provided by the one or more brake spring 26 thus biases the brake pad or ring 24 against the brake plate 18 so as to provide a frictional force therebetween, which inhibits or prevents the rotation of the brake plate 18 and the brake cage 14 connected thereto (relative to the brake pad or ring 24). However, the brake pad or ring 24 may not act on the input shaft 12 and so the input shaft 12 rotates relative to the brake cage 14, overcoming the biasing force of the biasing members 34.

FIG. 3B shows the mode in which the input shaft 12 rotates relative to the brake cage 14. The biasing members 34 permit such movement since the portions of each biasing member 34 that extend from the shaft 12 into contact with the brake cage 14 are resiliently flexible. FIG. 3B shows a mode in which the input shaft 12 rotates clockwise relative to the brake cage 14 and hence a first of said portions of each biasing member flex in an anti-clockwise direction. However, it is also contemplated that the shaft 12 may rotate anti-clockwise relative to the brake cage 14 and a second of said portions of each biasing member may flex in a clockwise direction. It is also contemplated that each biasing member 34 may comprise only a single portion that contacts the brake cage 14.

In this mode, rotation of the input shaft 12 relative to the brake cage 14 causes the ramps 30 on the input shaft 12 to move circumferentially relative to the apertures 32 of the brake cage 14. The engagement members 28 located in the apertures 32 of the brake cage 14 are prevented from moving circumferentially relative to the brake cage 14 by contact with the edges of the apertures 32. As the ramps 32 on the input shaft 12 move circumferentially relative to the engagement members 28, the engagement members 28 are moved up the ramps 32, out of the bottom of the wells thereof, resulting in the movement of the engagement members 28 away from the centre of the shaft 12 in a radial direction. This causes the engagement members 28 to be urged radially such that they are engaged with both the ramps 32 on the input shaft 12 and the output shaft 16 such that rotation of the input shaft 12 drives rotation of the output shaft 16.

Although the clutch assembly described above couples the input and output shafts 12,16 when the solenoid is not activated, a second set of embodiments is contemplated in which the clutch assembly may couple the input and output shafts 12,16 when the solenoid is activated. In these embodiments, the one or more brake spring 26 may be arranged to bias the brake pad or ring 24 away from the brake plates 18. Accordingly, in a mode of operation in which the solenoid 20 is deactivated, the brake pad or ring 24 may be biased away from the brake plates 18 and such that the clutch assembly may function as described above with respect to FIG. 3A. That is, rotation of the input shaft 12 does not drive rotation of the output shaft 16.

However, when it is desired to couple the input and output shafts 12,16 so that rotation of the input shaft 12 drives rotation of the output shaft 16, the solenoid 20 is activated. The solenoid 20 and the solenoid puller 22 may be arranged and configured such that in a mode when the solenoid 20 is activated (i.e. energised), the magnetic field generated by the solenoid 20 moves the solenoid puller 22 such that it urges the brake pad or ring 24 towards the brake plate 18, against the force of the one or more brake spring 26. The solenoid puller 22 therefore overcomes the biasing force of the one or more brake spring 26 so as to move the brake pad or ring 24 towards the brake plates 18, and into engagement or to a greater degree of engagement therewith (i.e. into contact, or such that frictional contact is increased). Thus, when the solenoid 20 is activated, rotation of the brake plate 18 and hence rotation of the brake cage 14 about the input shaft 12 is significantly inhibited by the brake pad or ring 24. This braking force on the brake cage 14 overcomes the rotational biasing force caused by the biasing members 34. As such, the input shaft 12 rotates relative to the brake cage 14 in the same manner to the clutch assembly described above with respect to FIG. 3B. Accordingly, a relatively small force provided by activating the solenoid 20 is able to cause a relatively large engagement force between the input shaft 12 and output shaft 16 due to it activating the urging of the engagement members 28 against the output shaft 16.

Embodiments are contemplated wherein the one or more brake spring 26 is not provided.

The invention claimed is:

1. A selective shaft engaging assembly comprising:
   a first shaft;
   a brake cage being rotatable with the first shaft;
   a surrounding member extending circumferentially around the brake cage;
   at least one engagement member coupled to the first shaft; and
   a braking mechanism configured for selectively applying a force to the brake cage for slowing or preventing rotational movement of the brake cage such that the first shaft rotates relative to the brake cage;
   wherein the assembly is configured such that when the first shaft rotates relative to the brake cage, said at least one engagement member is urged towards the surrounding member;
   wherein the brake cage comprises, or is coupled to, a brake plate or brake surface, and the assembly comprises a moveable member that is selectively movable into or out of contact with the brake plate or brake surface for providing a braking force on the brake plate or brake surface and hence to the brake cage;
   wherein the assembly comprises at least one biasing member coupling the first shaft to the brake cage such that rotation of the first shaft drives rotation of the brake cage; and
   wherein the at least one biasing member is configured to bias the circumferential position of the brake cage relative to the first shaft such that the engagement member is located on the surface of the first shaft at a first, radially inward position such that rotation of the first shaft is not prevented.

2. The assembly of claim 1, wherein the selective shaft engaging assembly is a braking assembly; wherein the surrounding member is a static earth ring, and wherein when the first shaft rotates relative to the brake cage, the at least one engagement member is urged towards the static earth ring such that rotation of the first shaft is inhibited or prevented.

3. The braking assembly of claim 2, wherein the brake cage is configured to prevent circumferential movement of the engagement member relative thereto, wherein the engagement member is arranged on a surface of the first shaft, and wherein the surface of the first shaft is configured such that when the first shaft rotates relative to the brake cage the engagement member is urged towards the static earth ring.

4. The braking assembly of claim 1, configured such that said rotation of the first shaft relative to the brake cage overcomes a biasing force of the at least one biasing member such that the engagement member is located on the surface of the first shaft at a second, radially outward position such that rotation of the first shaft is inhibited or prevented.

5. The assembly of claim 1, wherein the selective shaft engaging assembly is a clutch assembly; wherein the first shaft is an input shaft; wherein the surrounding member is an output shaft, and wherein when the input shaft rotates relative to the brake cage, the at least one engagement member is urged towards the output shaft so as to couple the input and output shafts such that rotation of the input shaft drives rotation of the output shaft.

6. The clutch assembly of claim 5, wherein the brake cage is configured to prevent circumferential movement of the engagement member relative thereto, wherein the engagement member is arranged on a surface of the input shaft, and wherein the surface of the input shaft is configured such that when the input shaft rotates relative to the brake cage the engagement member is urged towards the output shaft.

7. The clutch assembly of claim 6, comprising at least one biasing member coupling the input shaft to the brake cage such that rotation of the input shaft drives rotation of the brake cage.

8. The clutch assembly of claim 7, wherein the at least one biasing member is configured to bias the circumferential position of the brake cage relative to the input shaft such that the engagement member is located on the surface of the input shaft at a first, radially inward position such that the input and output shafts are not coupled to the extent that rotation of the input shaft would drive rotation of the output shaft.

9. The clutch assembly of claim 8, configured such that said rotation of the input shaft relative to the brake cage overcomes a biasing force of the at least one biasing member such that the engagement member is located on the surface of the input shaft at a second, radially outward position so as to couple the input and output shafts such that rotation of the input shaft drives rotation of the output shaft.

10. The assembly of claim 1, wherein the braking mechanism comprises a brake spring configured to bias the moveable member either towards or away from the brake plate or brake surface.

11. The assembly of claim 1, wherein the braking mechanism comprises an electromagnet arranged and configured such that when energized the electromagnet urges the moveable member away from or towards the brake plate or brake surface.

12. The assembly of any claim 1, wherein the movable member is a brake pad.

13. The assembly of claim 1, wherein the at least one biasing member comprises a plurality of biasing members, wherein each of the biasing members comprises at least one portion that contacts the inner surface of the brake cage such that a rotation of the shaft and the biasing members thereon causes the brake cage to rotate with the shaft.

14. The assembly of claim 13, wherein the plurality of biasing members are leaf springs.

* * * * *